(12) United States Patent
Sutherland

(10) Patent No.: US 7,434,636 B2
(45) Date of Patent: Oct. 14, 2008

(54) POWER SYSTEM FOR ELECTRIC AND HYBRID VEHICLES

(76) Inventor: Danilo R. Sutherland, 32 Bernard St., Merrick, NY (US) 11566

( * ) Notice: Subject to any disclaimer, the term of this patent is extended or adjusted under 35 U.S.C. 154(b) by 52 days.

(21) Appl. No.: 11/376,349

(22) Filed: Mar. 15, 2006

(65) Prior Publication Data

US 2006/0213697 A1 Sep. 28, 2006

Related U.S. Application Data

(60) Provisional application No. 60/663,078, filed on Mar. 18, 2005.

(51) Int. Cl.
*B60K 16/00* (2006.01)
(52) U.S. Cl. .................. 180/2.2; 180/2.1; 180/65.3; 180/65.2
(58) Field of Classification Search ................ 180/165, 180/2.1, 2.2, 65.1, 65.2, 65.3, 65.4
See application file for complete search history.

(56) References Cited

U.S. PATENT DOCUMENTS

| | | | | | |
|---|---|---|---|---|---|
| 3,713,503 | A | * | 1/1973 | Haan | 180/2.2 |
| 3,876,925 | A | * | 4/1975 | Stoeckert | 322/1 |
| 3,878,913 | A | * | 4/1975 | Lionts et al. | 180/2.2 |
| 4,019,828 | A | * | 4/1977 | Bunzer | 416/55 |
| 4,075,545 | A | * | 2/1978 | Haberer | 322/35 |
| 4,090,577 | A | | 5/1978 | Moore | |
| 4,093,035 | A | * | 6/1978 | Fletcher | 180/2.2 |
| 4,132,282 | A | * | 1/1979 | Sparks | 180/2.2 |
| 4,134,469 | A | * | 1/1979 | Davis | 180/2.2 |
| 4,141,425 | A | * | 2/1979 | Treat | 180/2.2 |
| 4,168,759 | A | * | 9/1979 | Hull et al. | 180/2.2 |
| 4,179,007 | A | * | 12/1979 | Howe | 180/2.2 |
| 4,254,843 | A | * | 3/1981 | Han et al. | 180/165 |
| 4,314,160 | A | * | 2/1982 | Boodman et al. | 290/55 |
| RE31,156 | E | * | 2/1983 | Dessert | 180/2.2 |
| 4,423,368 | A | * | 12/1983 | Bussiere | 322/35 |
| 4,592,436 | A | * | 6/1986 | Tomei | 180/2.2 |
| 5,280,827 | A | * | 1/1994 | Taylor et al. | 180/165 |
| 5,287,004 | A | * | 2/1994 | Finley | 290/55 |
| 5,296,746 | A | * | 3/1994 | Burkhardt | 290/55 |
| 5,386,146 | A | * | 1/1995 | Hickey | 290/55 |
| 5,746,283 | A | * | 5/1998 | Brighton | 180/65.3 |
| 5,760,515 | A | * | 6/1998 | Burns | 310/115 |
| 6,138,781 | A | * | 10/2000 | Hakala | 180/2.2 |
| 6,406,090 | B1 | | 6/2002 | Tolinski et al. | |

(Continued)

*Primary Examiner*—Jeffrey J Restifo
(74) *Attorney, Agent, or Firm*—Keusey, Tutunjian & Bitetto, P.C.

(57) ABSTRACT

A power system for an electric vehicle, the power system comprising at least one power generating device selected from a group consisting of a solar panel, a wind turbine capable of producing electrical power, an auxiliary generator driven by an internal combustion engine, and a generator for producing electrical power mechanically connected to, and driven by the rotational force of an axle of a vehicle. The power system being further comprised of a charging device, a battery control device, at least one battery, a motor control device, an electric drive motor electrically connected to the motor control device, and a driver interface connected to the motor control device. The electric drive motor may be used to generate power through regenerative braking. The wind turbine may be raised outside the body of a vehicle while the vehicle is not in motion. The solar panel may be disposed outside the vehicle while remaining electrically connected to the charging device.

6 Claims, 4 Drawing Sheets

U.S. PATENT DOCUMENTS

| | | | | |
|---|---|---|---|---|
| 6,423,894 B1 * | 7/2002 | Patz et al. | | 136/244 |
| 6,668,954 B2 | 12/2003 | Field | | |
| 6,758,295 B2 * | 7/2004 | Fleming | | 180/165 |
| 6,857,492 B1 * | 2/2005 | Liskey et al. | | 180/165 |
| 6,897,575 B1 * | 5/2005 | Yu | | 290/44 |
| 6,966,394 B2 * | 11/2005 | Fleming | | 180/165 |
| 7,147,069 B2 * | 12/2006 | Maberry | | 180/2.2 |
| 2002/0153178 A1 * | 10/2002 | Limonius | | 180/2.2 |
| 2005/0103537 A1 * | 5/2005 | Michaud et al. | | 180/2.2 |
| 2006/0113118 A1 * | 6/2006 | Kim | | 180/2.2 |

\* cited by examiner

US 7,434,636 B2

POWER SYSTEM FOR ELECTRIC AND HYBRID VEHICLES

PRIORITY

This application claims the benefit of the filing date of Provisional Application No. 60/663,078, filed Mar. 18, 2005, and which is herein incorporated by reference.

BACKGROUND OF THE INVENTION

1. Technical Field

The present invention relates generally to electrical vehicle power systems, and more specifically to an electric vehicle power system with at least one integrated charging system.

2. Background of the Invention

The internal combustion engine has been commonly used for many decades as the motive power for automobiles. However, with the rising cost of petroleum products, namely gasoline and diesel, an alternative method for powering automobiles is needed.

Recently, several manufacturers have introduced hybrid vehicles to the market in an effort to provide consumers with an opportunity to obtain more fuel efficient automobiles. Currently, systems such as Toyota's® Hybrid Synergy Drive® pair an electric engine with a conventional petroleum internal combustion engine in an effort to increase vehicle gasoline mileage. However, the mileage gains achieved by such hybrid vehicles still tend to be modest, at best. With only modest gains in mileage by hybrid automobiles, supplementing combustion engine power with electric engine power does not offer a sufficient reduction in petroleum usage. U.S. Pat. No. 6,668,954, to Field, entitled "Electric Hybrid Vehicle", discloses such a system, wherein the battery is charged by a generator connected to the combustion drive motor, the generator charging the battery system while the vehicle is running.

Automobiles powered predominantly by electricity provide an attractive alternative to both purely petroleum powered automobiles and hybrid powered automobiles. However, one of the primary drawbacks of electric vehicles is their very limited range.

Some attempts to solve this problem include U.S. Pat. No. 4,090,577, to Moore, et al, entitled "Solar Celled Hybrid Vehicle", which discloses a vehicle powered by a combination of electric and combustion engines, with solar cells disposed within the upper surfaces of the vehicle. However, Moore dies not include any method for charging the electrical system at night, or during overcast conditions when an external charger is not available.

Similarly, U.S. Pat. No. 6,406,090, to Tolinski, et al, entitled "Self-Powered Solar Sunroof", discloses a solar panel powering, and disposed within a vehicle's sunroof. However, Tolinski does not disclose using the solar cells to provide electrical power sufficient to drive the vehicle electrically, nor does Tolinski disclose a method for charging the electrical system by any method other than a solar cell.

Currently, the few electric vehicles available today use batteries an energy storage means. These batteries are generally serviced by a dedicated, fixed battery charger, which converts 110 volt a.c. wall current to a direct current suitable for charging the batteries. The drawback to charging an electric vehicle solely with a non-portable charging device is that when driving an electric vehicle, with its inherently short range, drivers face a risk of being stuck in an area where a charger is not available.

Accordingly, a need exists for a vehicle powered primarily by electricity, in which a charge may be generated without the need for an external or fixed stationary electric source.

SUMMARY OF THE INVENTION

It is therefore an object of the invention to provide a power system capable of powering an electric vehicle, where the power system is capable of recharging itself through a variety of methods.

This and other object are achieved in accordance with an embodiment of the invention. The power system includes a solar panel, a wind turbine and combustion engine driven auxiliary generator. The wind turbine may be disposed within the front of the vehicle in order to produce electrical power while the vehicle is moving forward, and may be elevated to a raised position outside the body of the vehicle so that the turbine may rotate to face into the wind.

In accordance with other aspects of the invention, the power system also include a charging device, a battery control device, at least one battery, a motor controller and an electric drive motor.

The power system may also include an axle generator producing electrical power, and being connected attached to, and driven by the rotation of the vehicle's axle.

Other embodiments contemplate the electric drive motor generating electrical power to recharge the batteries through the process of regenerative braking.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings where like reference numerals depict similar elements throughout the views.

DETAILED DESCRIPTION OF PREFERRED EMBODIMENTS

Figure 1:
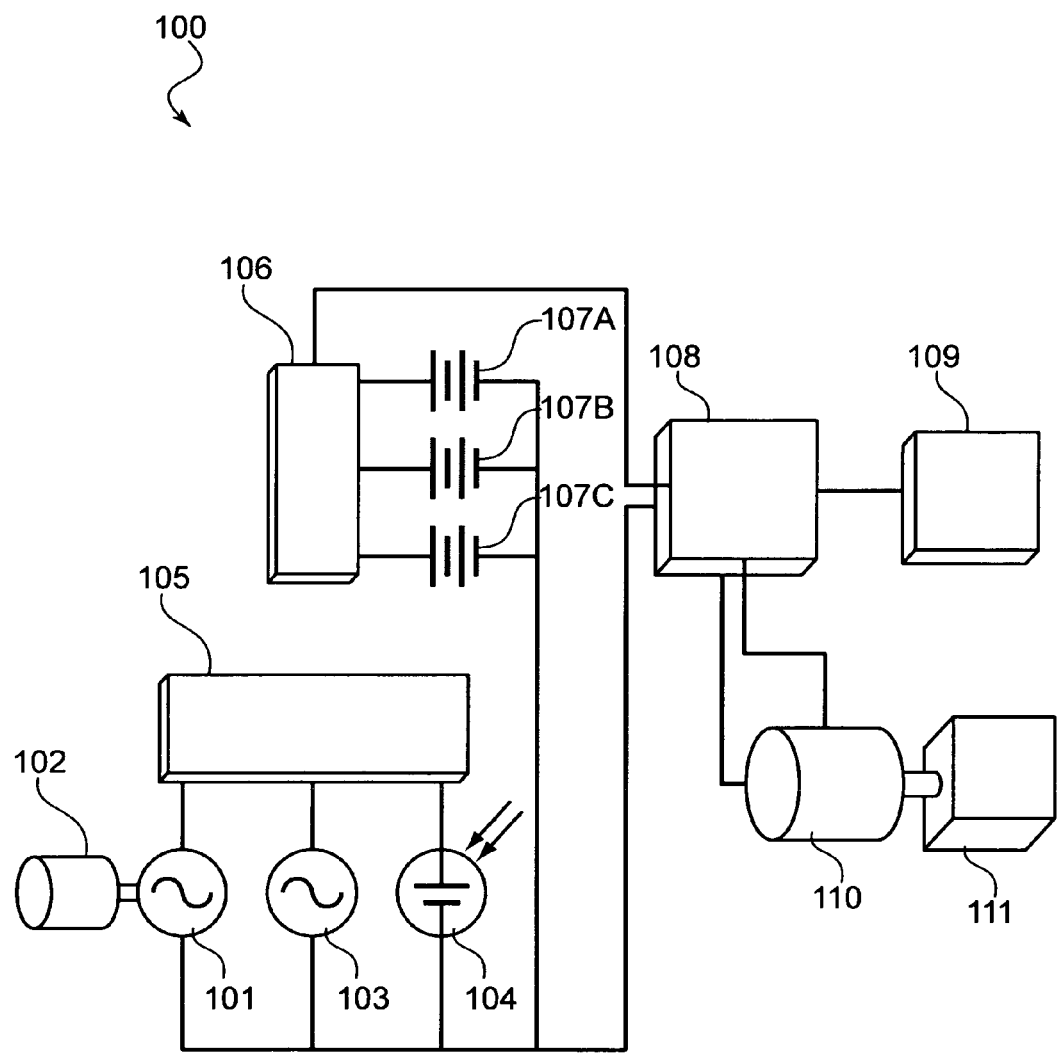
FIG. 1 is a block diagram illustrating the interconnectivity of the active components comprising an exemplary embodiment of a power system for an electric or hybrid vehicle.

Referring now to the Figures, where like numbers indicate like features, the illustration of FIG. 1 depicts a block diagram illustrating an exemplary layout and interconnectivity of devices comprising a power system for electric and hybrid vehicles 100 (hereinafter, power system).

The power system 100 may include a power generating device 101 such as, but not limited to, an alternator or electrical generator connectively attached to an auxiliary internal combustion motor 102. In one exemplary embodiment, the auxiliary motor may be a small internal combustion motor left in an idle or stopped state until needed to drive the power generating device. In a particularly useful embodiment, the auxiliary motor 102 may be started and used to drive the power generating device 101 to generate power sufficient to charge any batteries (107A-C) disposed within the power system 100, allowing a driver to continue use of a vehicle within which the power system 100 is disposed.

The power system 100 may also include a power generating device 103 such as an alternator or generator connectively attached to a wind turbine. The power system 100 may also include a power generating device such as a solar cell capable of charging or maintaining the charge on any batteries 107A-C that may be disposed within the power system 100. The solar cell power source 104 may be disposed within a surface of the vehicle, or the solar cell power source 104 may be portable, capable of being carried within the vehicle, and deployed to charge the power system's 100 batteries 107A-C when the vehicle is not in use.

The power sources 101, 103, 104 are electrically connected to a charging unit 105, which is then in turn electrically connected to a battery controller or switch 106. The charging unit 105 may act as a voltage regulator for each of the power sources 101, 103, 104 or may act to provide a proper electrical load to any power generating devices 101, 103, 104 that may generate excess or unneeded power. The battery controller or switch 106 may allow one or more batteries 107A-C to be electrically connected to the power system 100. The battery controller 106 may also allow selection of one or more batteries 107A-C to provide electricity to the power system 100. The battery controller 106 may automatically select which battery powers the power system, or the battery controller 106 may allow a user to manually select the preferred battery. The battery controller 106 may also regulate the charging of each of the batteries 107A-C by directing any current being delivered from the charging unit 105 to any battery 107A-C that may need charging. Furthermore, the battery controller or switch 106 may be integrated into a single unit with the charging unit 105.

The power system 100 may also include one or more batteries 107A-C electrically connected to the battery controller pr switch 106, used for storing an electrical charge to be used to power the power system 100. The batteries 107A-C maybe removable for replacement, may consist of, but are not limited to, lead-acid batteries, nickel cadmium batteries, nickel metal hybrid batteries, lithium polymer batteries, ultracapacitors or any other known or undiscovered device capable of accepting, storing and delivering an electrical charge.

The power system 100 may also include a motor controller 108 electrically connected to the battery control or switch 106 and a drive motor 110. The motor controller 108 may regulate electrical current from the battery controller 106 to the drive motor 110. In one exemplary embodiment, the motor controller 108 may variable pulse the electrical current to the drive motor 110 in order to vary the drive motor's 110 speed. In another useful embodiment, the motor controller may vary or reverse the voltage provided to the drive motor 110 in order to control the drive motor's 110 speed.

A driver interface 109 may also be disposed within the power system 100. The driver interface 109 is electrically connected to the motor controller 108, and provides a method for allowing a driver provide information to the motor controller 108 allowing the motor controller 108 to in turn control the speed of the drive motor 110. The driver interface 109 may be in the form of a simple accelerator pedal connected to a variable resistor or potentiometer to provide a variable voltage indicating the desired drive motor 110 speed.

The power system 100 may also include an electric drive motor 110 electrically connected to the motor controller 108. The drive motor 110 may also be mechanically connected to a transmission 111 for transferring mechanical energy to the vehicle's wheel, providing propulsion for the vehicle. In one exemplary embodiment, the drive motor 110 may also be used as an axle generator, capable of producing electrical power through regenerative braking.

Figure 2:
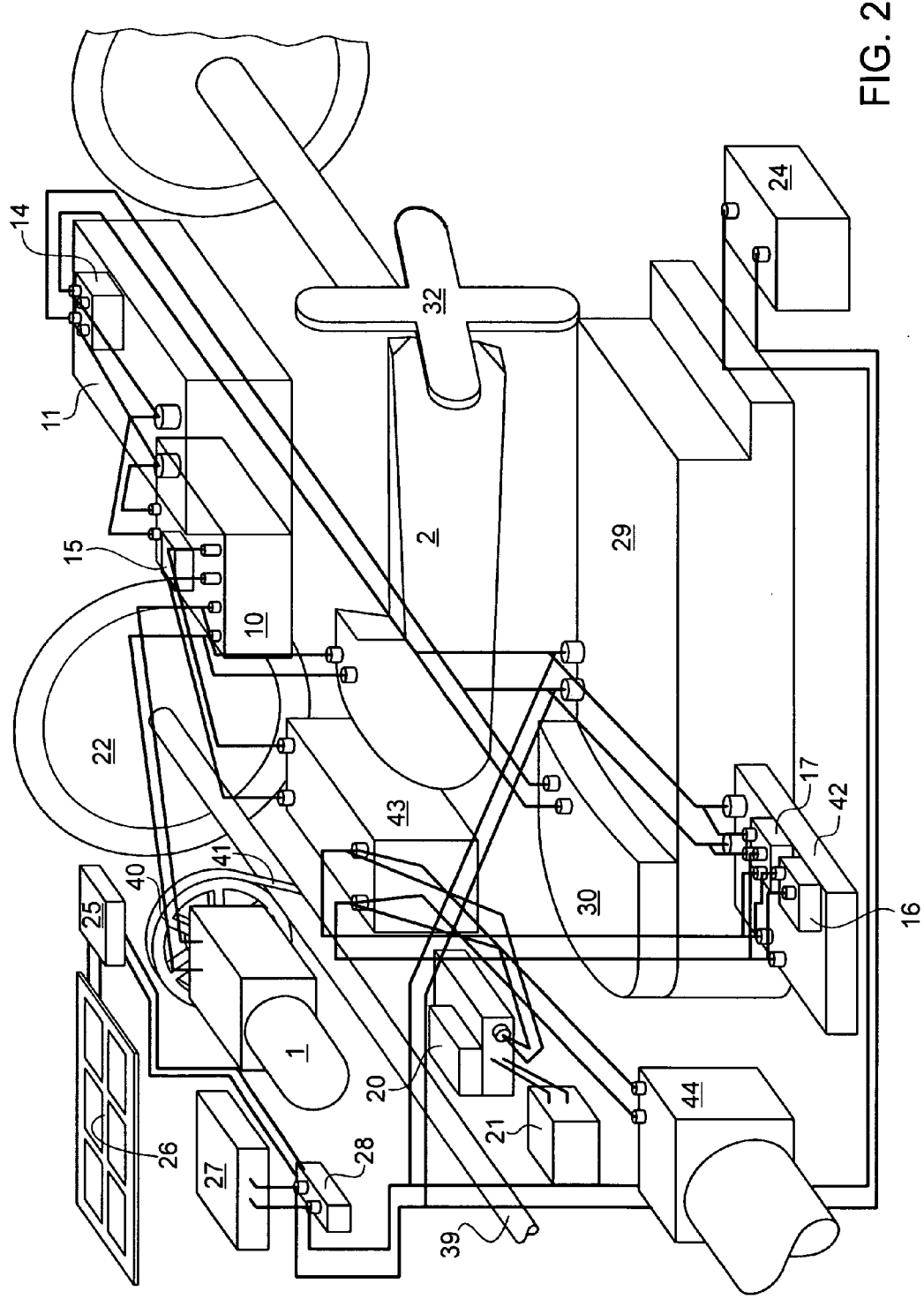
FIG. 2 is a view of an exemplary layout of a power system for an electric or hybrid vehicle.

Referring now to FIG. 2, another exemplary embodiment of the advanced power system for an electric or hybrid vehicle is shown.

In this exemplary embodiment, an axle generator 1 may be mechanically attached to a flywheel or clutch 40, which is in turn connectively attached to a vehicle axle 39 via a belt or chain 41. In one exemplary embodiment, the flywheel or clutch may be controlled in such a manner as to allow the axle generator to be advantageously mechanically disconnected from the vehicle axle 39. For example, during acceleration, when extra power is needed at the vehicle wheels 22, the clutch 40 may disengage from axle generator 1, allowing the clutch or flywheel to rotate with the axle 39, without driving the axle generator 1.

The axle generator 1 may also electrically connected to an inverter 10. The inverter 10 may convert the direct current (d.c.) electrical power to alternating current (a.c.) electrical power. The inverter 10 may also be electrically connected to a power generator 2 driven by a wind propelled turbine 32.

The inverter 10 may be further electrically connected to a charger 43 which may control and distribute electrical power to one or more a battery packs 11 and 42. The charger may also be electrically connected to a power supply 20. In one exemplary embodiment, the power supply 20 may be used as a connection point for an external source providing electrical power for charging the power system's 100 batteries 11 and 42. The power supply may be electrically connected in turn to a controller 21 which may regulate any power being received from an external source by the power supply 20, and which, in particularly useful embodiments may be integrated into the power supply 20.

The batteries 11 and 42 may include a reducer or voltage regulator 14 and 17, and are electrically disposed between the charger 43 and an electric drive motor 29. The batteries 11 and 42 may also be electrically connected to a gear or drive train 30. in one exemplary embodiment, the batteries 11 and 42 may provide power to an electrically switched transmission disposed within the gear train, or to an electrically controlled constant velocity transmission.

The charger 43 may also be electrically connected to an auxiliary generator 44. In one exemplary embodiment, the auxiliary generator may be power by a combustion engine using a fossil fuel such as diesel, kerosene, gasoline, or natural gas, or may be powered by another suitably combustible fuel such as ethanol.

The power system 100 may be further comprised of a second charging system, which itself is comprised of a solar panel 26 electrically connected to an inverter 25, which is in turn electrically connected to a charger 28. The charger 28 may be subsequently electrically connected to one or more batteries 24 and 27 for storage of an electrical charge. The batteries 24 and 27 may also be electrically connected to the motor 29 in order to provide electrical power to the motor 29 allowing propulsion of the vehicle.

Figure 3A:
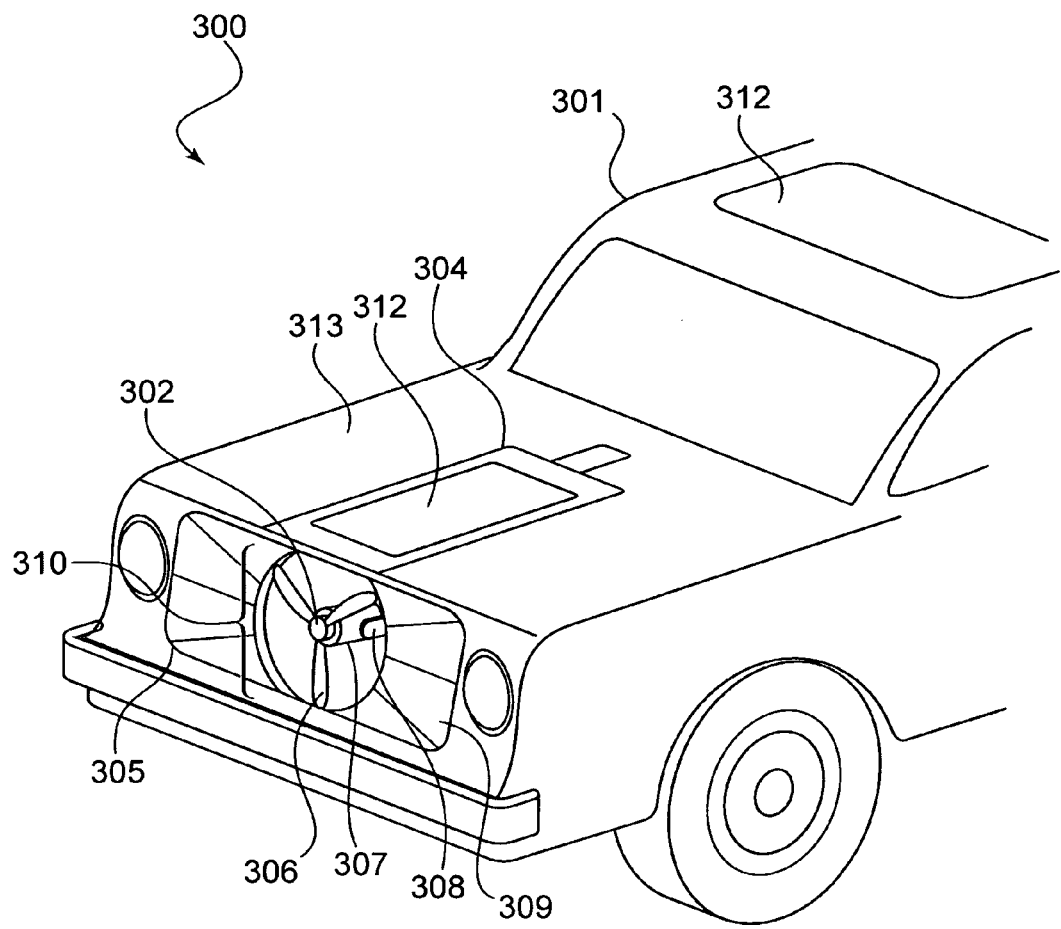
FIG. 3A is an exemplary view of the front and top of a vehicle equipped with a power system for an electric or hybrid vehicle including a wind-powered charging system disposed within the body of the vehicle.

FIG. 3A is an exemplary view of the front and top of a vehicle equipped with a power system for an electric or hybrid vehicle including a wind-powered charging system disposed within the body of the vehicle.

In the exemplified embodiment 300 of a power system for an electric vehicle, a vehicle 301 with an electric power system 100 has an air inlet opening 305 disposed within the front of the vehicle 301, for allowing airflow sufficient to power a wind turbine driven charging system. Within the opening 305, a wind turbine assembly 310 is disposed facing the direction of normal vehicle travel. The wind turbine assembly 310 may be comprised of one or more wind turbine blades 306 attached to a central hub 307, which is then fixedly attached to the input shaft a power generating device 307 such as a generator or alternator, and is electrically connected to the electrical power system 100. The central hub 302 may be comprised of a gear system allowing the affixed turbine bladed 306 to rotate longitudinally, varying the angle of attack of the turbine blades 306 to most efficiently turn the input shaft of the power generating device based on the speed of the incoming wind.

The power generating device 307 may then be rotatably attached to a support bracket 308 holding the wind turbine assembly 310 in a position to be advantageously exposed to oncoming air as the vehicle 301 moves forward. The support bracket 308 is in turn rotatably attached to the vehicle, allowing the wind turbine assembly 310 to be moved to a raised position outside the body of the vehicle 301.

The vehicle 301 may have a shroud or cowl 309 further disposed within the air inlet opening 305. The shroud 309 is disposed in such a manner as to funnel air to the wind turbine assembly 310 while the wind turbine assembly 310 is in a lowered position, disposed within the body of the vehicle 301.

The vehicle 301, within which the power generating system is disposed, may also include one or more wind turbine doors 304 hingedly disposed within the hood 303 or other upper surface of the vehicle 301. The wind turbine door 304 opens to allow the wind turbine assembly 310 to be raised above the vehicle's 301 hood 303, and left open or be closed while the wind turbine assembly 310 is deployed in the raised position. The vehicle 301 may also have one or more solar panels 312 fixedly disposed within the one or more of the upper surfaces of the vehicle, such as the roof or wind turbine door 304.

Figure 3B:
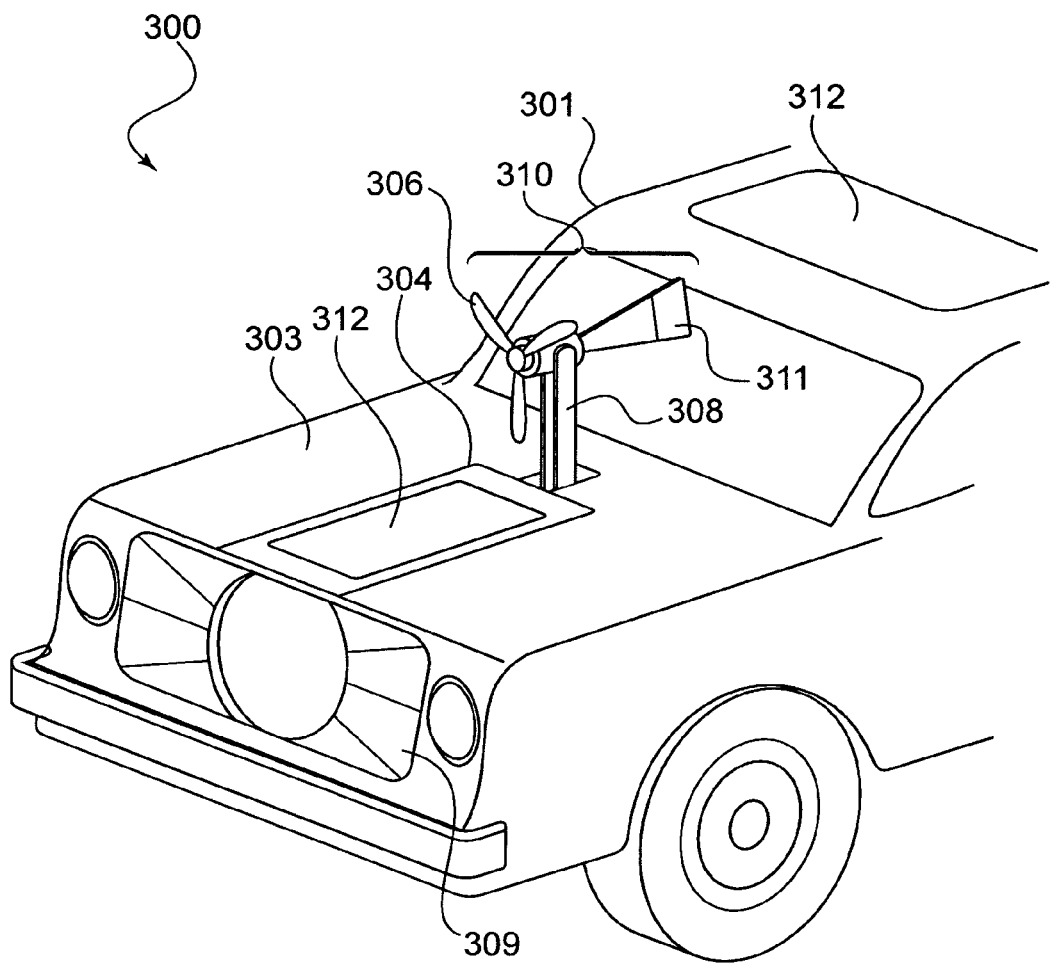
FIG. 3B is an exemplary view of the front and top of a vehicle equipped with a power system for an electric or hybrid vehicle including a wind-powered charging system advantageously deployed outside the body of the vehicle.

FIG. 3B is an exemplary view of the front and top of a vehicle equipped with a power system for an electric or hybrid vehicle including a wind-powered charging system advantageously deployed outside the body of the vehicle.

The wind turbine assembly 310 may be raised through the wind turbine door 304 hingedly disposed within the hood 303 of the vehicle 301. the wind turbine assembly 310 may also include a wind vane 311 fixedly attached to the wind turbine assembly 310, allowing the wind turbine assembly 310 to advantageously rotate to turn the plane of the wind turbine blade 306 rotation perpendicular to any oncoming wind. In one useful embodiment, the wind turbine assembly 310 may be automatically raised, via an electric servo motor system, through the wind turbine door 304 disposed within the vehicle's 301 hood 303, where the raising is triggered by removal of the vehicle's 301 key from the ignition. Additionally, the vehicle may be equipped with a wind turbine defeat switch which may prevent the automatic raising of the wind turbine assembly 310 when the driver desires to prevent such automatic deployment.

In yet another particularly useful embodiment, the wind turbine assembly 310 is disposed within the body of the vehicle 301, generating electricity from wind caused by the forward motion of the vehicle 301. In this useful embodiment, the wind turbine assembly 310 may be moved to a raised position when the vehicle 301 is not in use, so that the wind turbine may take advantage of any wind available for generating power.

Additionally, the wind turbine assembly 310 may be attached to the support bracket 308 by a lockable pivot that allows the wind turbine assembly 310 complete rotational freedom about the vertical axis in order to track the wind. The lockable pivot may also force the wind turbine assembly 310 into a forward facing position suitable for withdrawal into the hood 303 of the vehicle 301 when locked.

Those of ordinary skill in the art will recognize that the examples given herein are for exemplary purposes and may be changed without departing from the spirit of the invention.

Although illustrative embodiments of the present invention have been described herein with reference to the accompanying drawings, it is to be understood that the invention is not limited to those precise embodiments, and that various other alterations, modifications and improvements may be affected therein by one skilled in the art. Such alterations, modifications and improvements are intended to be within the scope and spirit of the present invention. Accordingly, the foregoing description is by way of example only and is not intended to be limiting. This invention should be limited only by the claims and equivalents thereof.

What is claimed is:

1. A power system for powering an electric vehicle, the power system disposed within the electric vehicle, the vehicle comprising:

a vehicle body with at least one upper surface and a roof;

an electrical generator powered by an internal combustion engine, wherein the internal combustion engine does not provide motive force to the vehicle;

at least one solar panel electrically connected to the power system, wherein the at least one solar panel is capable of charging the power system;

a hood;

a wind turbine door hingedly attached to, and disposed within the hood;

an air intake in the front surface of the vehicle, wherein air is forced into the air intake by the forward motion of the vehicle;

a wind turbine cowling disposed within the air intake;

a wind turbine assembly electrically attached to the power system, wherein the wind turbine assembly is capable of producing electrical power, wherein the wind turbine assembly is capable of being raised outside the body of the vehicle while the vehicle is not in motion, wherein the wind turbine assembly is disposed within the vehicle when in a lowered position, wherein the wind turbine cowling funnels air into the wind turbine assembly when the wind turbine assembly is in the lowered position;

wherein the wind turbine assembly is comprised of:

a power generating device with an input shaft, the power generating device electrically connected to the power system;

a vane attached to the power generating device capable of orienting the wind turbine assembly in such a manner that the longitudinal axis of the input shaft is parallel to a wind direction;

a central hub, wherein the central hub is fixedly attached to an input shaft of a power generating device, wherein the central hub may rotate the power generating device input shaft along the longitudinal axis of the input shaft;

at least one wind turbine blade attached to a central hub;

a support bracket to which the power generating device is attached, which support bracket is attached to an electric vehicle; and and a means for pivoting the support bracket to alternatively position the wind turbine assembly within the hood operatively disposed behind the wind turbine cowling and outside the hood so that the vane can freely rotate the wind turbine assembly into the wind.

2. The power system of claim 1, wherein the wind turbine assembly is brought to a raised position upon a driver's removal of an ignition key from an ignition disposed within the vehicle.

3. The power system of claim 2, the vehicle further comprising a wind turbine defeat switch, wherein upon activation, prevents the wind turbine from being automatically raised by the driver's removal of the ignition key from the ignition.

4. The power system of claim 1, wherein the power generating device is attached to the support bracket via a pivot, wherein the pivot allows the power generating device with attached central hub, vane and turbine blades to rotate on a vertical axis.

5. The power system of claim 4, wherein the pivot means further comprises a locking mechanism, the locking mechanism capable of rotating the power generating device and attached central hub, vane and at least one turbine blades back into an orientation suitable for lowering of the wind turbine assembly into the vehicle.

6. The power system of claim 1, wherein at least one solar panel electrically connected to the power system is disposed on the roof, the hood and the wind turbine door.

* * * * *